United States Patent [19]

Kamiya

[11] 4,203,500
[45] May 20, 1980

[54] APPARATUS FOR PREVENTING TURNOVER OF A MOTORIZED TWO-WHEELED VEHICLE

[75] Inventor: Tadashi Kamiya, Niiza, Japan

[73] Assignee: Honda Giken Kogyo Kabushiki Kaisha, Tokyo, Japan

[21] Appl. No.: 927,596

[22] Filed: Jul. 21, 1978

[30] Foreign Application Priority Data

Jul. 25, 1977 [JP] Japan ................................ 52-88300

[51] Int. Cl.² ........................................ B62D 61/04
[52] U.S. Cl. ...................................... 180/219; 280/293
[58] Field of Search ..................... 180/30, 21; 280/293

[56] References Cited

U.S. PATENT DOCUMENTS

| | | | |
|---|---|---|---|
| 1,152,821 | 9/1915 | Kurtz | 180/30 |
| 3,700,059 | 10/1972 | Sutton | 180/21 |
| 4,133,340 | 1/1979 | Hoo | 280/293 X |

FOREIGN PATENT DOCUMENTS 355697  7/1922  Fed. Rep. of Germany ............ 280/293

*Primary Examiner*—John A. Pekar
*Attorney, Agent, or Firm*—Haseltine, Lake & Waters

[57] ABSTRACT

An apparatus for preventing turnover of a motorized two-wheeled vehicle of the type in which the vehicle body is provided on both sides thereof with a pair of left and right subsidiary wheels on a pair of left and right swingable arm members. On respective upper sides of the arms are a pair of left and right oil pressure dampers each interposed between the vehicle body and the arm member, and respective oil pressure chambers of the two oil pressure dampers are interconnected through a connecting tube having a flow control valve at the center thereof. The vehicle body supports an internal combustion engine between the front and rear wheels so that the center of gravity thereof is positioned approximately midway between the wheels, the pair of subsidiary wheels being disposed on a line extending in the vicinity of the center of gravity.

7 Claims, 16 Drawing Figures

APPARATUS FOR PREVENTING TURNOVER OF A MOTORIZED TWO-WHEELED VEHICLE

FIELD OF THE INVENTION

This invention relates to an apparatus for preventing turnover of a motorized two-wheeled vehicle, such as a motorcycle or the like.

PRIOR ART

The applicant has previously proposed an apparatus of this kind in which the vehicle body is provided on both sides thereof with a pair of left and right subsidiary wheels on a pair of left and right swingable arm members, and on respective upper sides of the arms a pair of left and right oil pressure dampers are each interposed between the vehicle body and the arm member, respective oil pressure chambers of the two oil pressure dampers being interconnected through a connecting tube having at its middle portion a flow control valve, so that when the vehicle body is inclined towards one side, the subsidiary wheel on that one side strikes the ground and the oil pressure damper on the upper side thereof softens the impact shock thereof, and oil within this damper is introduced into the oil pressure damper on the other side and expands the same and thus the subsidiary wheel on the other side also strikes the ground. In this case, the attaching position of the pair of subsidiary wheels in relation to the vehicle body presents a problem, and in the case where the subsidiary wheels are disposed, for instance, on both lateral sides of the rear wheel of the vehicle, turnover of the vehicle body to the right and the left can be prevented, but turnover of the vehicle obliquely towards the front thereof can occur subsequently to the grounding of the subsidiary wheels. Additionally, this arrangement has the disadvantage that when the vehicle body undergoes rolling and pitching during normal running, the subsidiary wheels can unexpectedly strike the ground.

SUMMARY OF THE INVENTION

An object of this invention is to provide an apparatus free from these disadvantages.

According to this invention, in an apparatus of the type in which the vehicle body is provided on both sides thereof with a pair of left and right subsidiary wheels by a pair of left and right swingable arm members, and in which on respective upper sides of the arms are a pair of left and right oil pressure dampers each interposed between the vehicle body and the arm member, respective oil pressure chambers of the two oil pressure dampers being interconnected through a connecting tube having at its middle portion a flow control valve, the invention is characterized in that the vehicle body which has an internal combustion engine at the middle portion thereof between the front wheel and the rear wheel so that the center of gravity of the vehicle is positioned at or near the middle portion, said pair of subsidiary wheels are disposed on both lateral sides along a line extending in the vicinity of the center of gravity.

BRIEF DESCRIPTION OF THE DRAWINGS

Embodiments of this invention will now be described with reference to the accompanying drawings in which.

DETAILED DESCRIPTION

Referring to the drawings, numeral 1 denotes a vehicle body having a front wheel 2 and a rear wheel 3 and an internal combustion engine 4 approximately midway between the wheels for power drive of the vehicle which may be a motorized two-wheeled vehicle, such as a motorcycle or the like. The vehicle body 1 is so constructed that the center of gravity G thereof is located at or near the middle thereof in the longitudinal direction mainly due to the engine 4. Numeral 5 denotes a driver's seat and numeral 6 denotes a steering handle.

Secured to the vehicle body 1 near the center of gravity G is a machine frame 7, and a pair of substantially horizontal left and right arm members 9 are pivotally mounted at both sides of the machine frame 7 so as to be swingable upwards and downwards. Each arm member supports a subsidiary wheel 8 at its outer end and additionally above the arms 9 are a pair of left and right oil pressure dampers 12. Each damper 12 is pivotally attached at its outer end 11 to a respective arm member 9 and at its inner end to the machine frame 7. Oil pressure chambers 13 of the dampers 12 are interconnected by a connecting tube 15 having at its middle portion a flow control valve 14 provided with an orifice or the like. Each of the oil pressure dampers 12 is essentially conventional and comprises a piston 12b urged forwardly by a spring 12c housed in a cylinder 12a, oil chamber 13 being formed behind the piston 12b. The arrangement is such that the pair of left and right subsidiary wheels 8 are disposed on both sides of the vehicle body 1 in the vicinity of the center of gravity G thereof.

Figure 1:
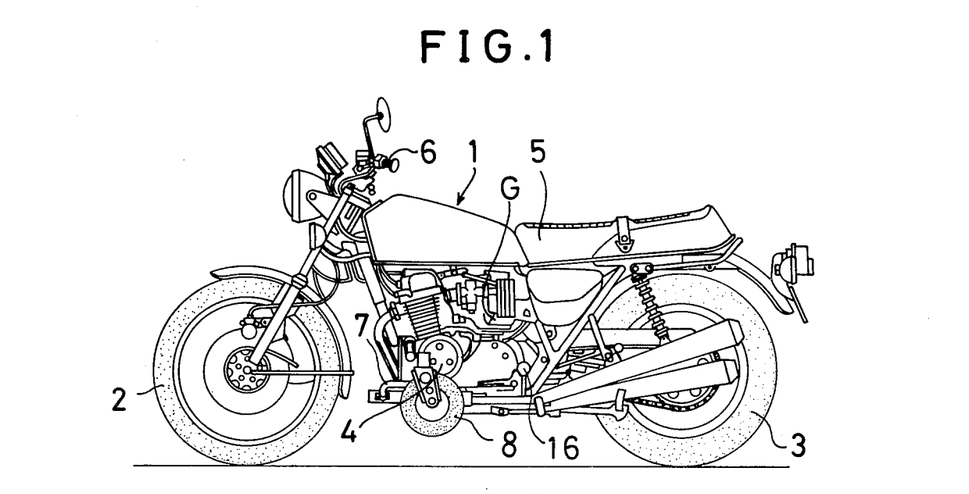
FIG. 1 is a side view of one embodiment of the apparatus of this invention.
Figure 2:
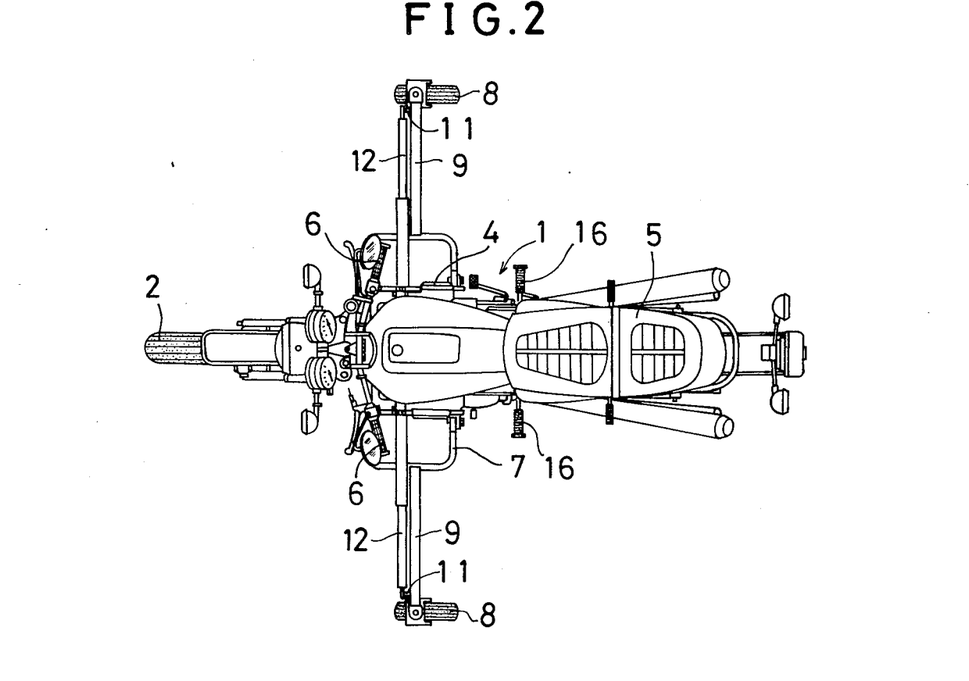
FIG. 2 is a top plan view thereof.
Figure 3:
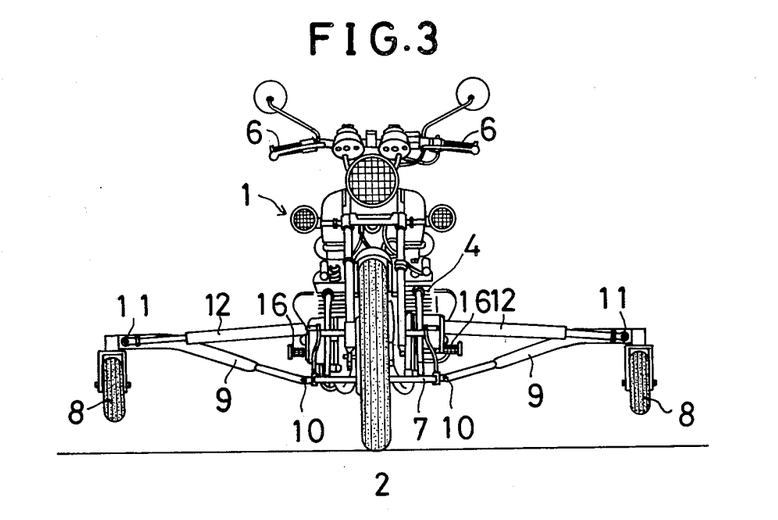
FIG. 3 is a front view thereof.
Figure 4:
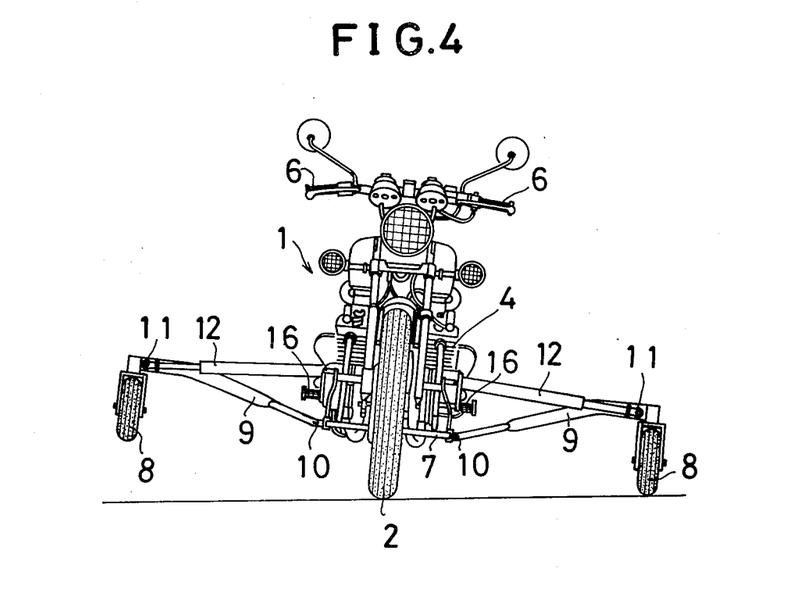
FIGS. 4 to 6 are front views showing the operation thereof.
Figure 5:
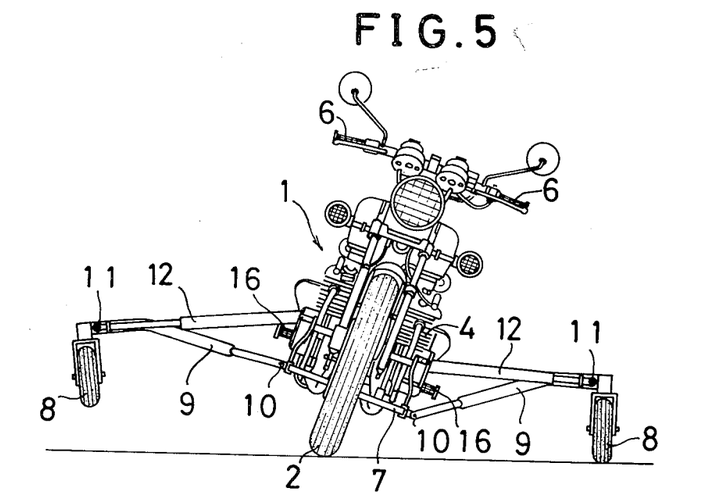
Figure 6:
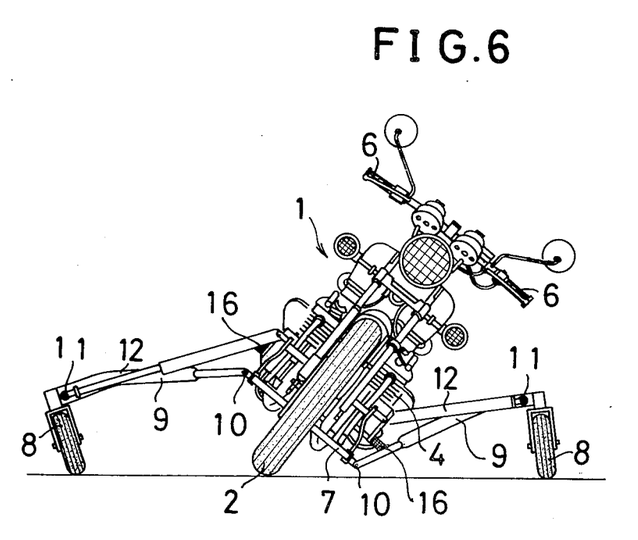
Figure 7:
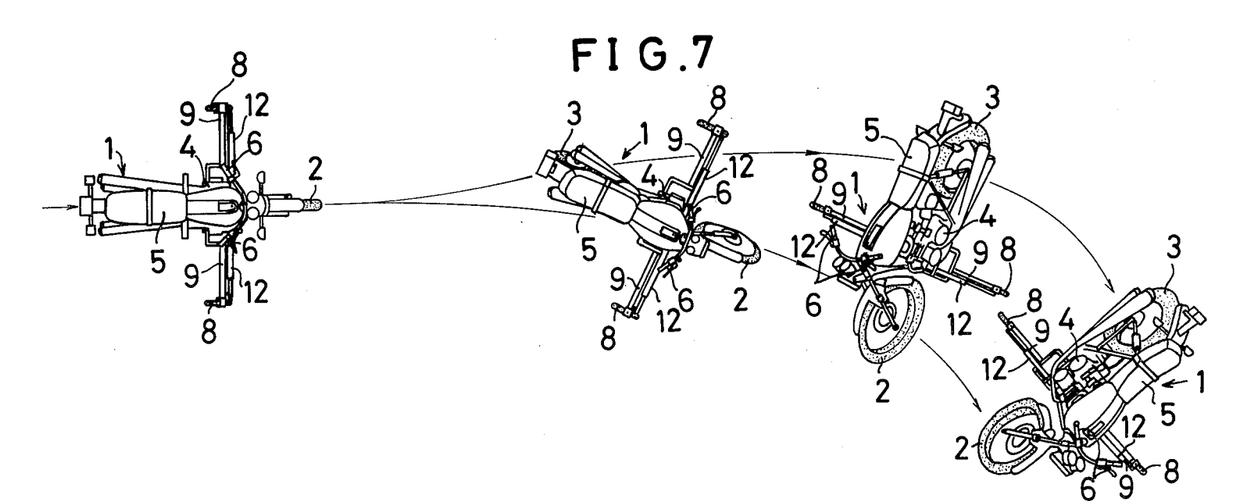
FIG. 7 is a top plan view showing the operation of the apparatus when the vehicle is spun.
Figure 8:
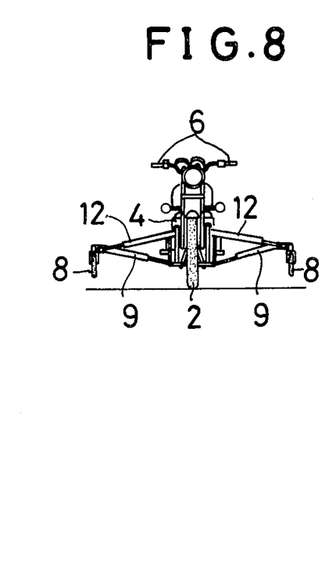
FIGS. 8 to 11 are front views of the vehicle during respective stages of the operation.
Figure 9:
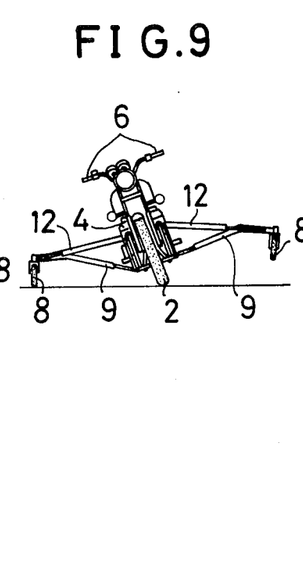
Figure 10:
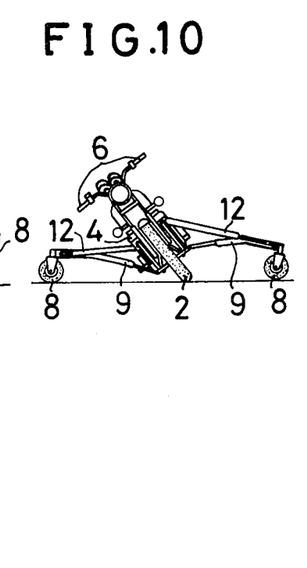
Figure 11:
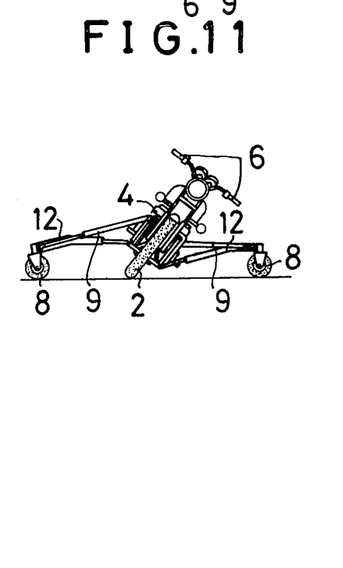

The operation of the apparatus is as follows:

During normal driving, the apparatus is in the position as shown in FIGS. 1 to 3. If, then, the vehicle body 1 begins to turn over towards one side, as shown in FIG. 4, the subsidiary wheel 8 on that one side first contacts the ground and the oil pressure damper 12 above the wheel 8 is compressed for damping the shock. If the inclination of the vehicle body 1 is thereafter increased, as shown in FIG. 5, the damper 12 is further compressed to further dampen the shock, and at the same time oil within the oil pressure chamber 13 thereof is introduced into the oil pressure chamber 13 of the oil pressure damper 12 on the other side, and during this operation, the flow control valve 14 provides throttling for effecting a buffer action. Consequently, the damper 12 on the other side is expanded and the subsidiary wheel 8 on the other side also contacts the ground as shown in FIG. 6. Thus the vehicle body 1 is supported at both sides by the subsidiary wheels 8 and is kept in a stable condition.

The above operation is not particularly different from that in the apparatus previously proposed by the Applicant. According to the present invention, however, the subsidiary wheels 8 are so disposed as mentioned above, as to be on both sides along a line extending in the vicinity of the center of gravity G at the middle portion of the vehicle body 1, and consequently the following advantageous effects are brought about:

Namely, if there is now considered the case where the subsidiary wheel 8 on one side has contacted the ground the vehicle body 1 is in a configuration in which it is supported at three points, i.e. the front wheel 2, the rear wheel 3 and the subsidiary wheel 8 on one side. Hence, the vehicle is supported at the front and rear and in the middle at a lateral side thereof so that a stable support is obtained. If a case is assumed in which the subsidiary wheels 8 were positioned on both sides of the rear wheel 3, for instance, the vehicle body 1 when supported at three points, is capable of falling obliquely forwards. Such disadvantage is prevented by the construction according to this invention.

This construction is especially advantageous when the vehicle body 1 is subjected to spinning, and this condition is shown in FIGS. 7 to 11. In this case, the vehicle body 1 is mainly spun first with the subsidiary wheel 8 on one side in its grounded condition which results in a large inclination toward the wheel 8 on one side, and thereafter the vehicle is brought into the condition in which it is inclined towards the other side by the reaction force and stops in this condition. On this occasion, turnover of the vehicle towards the oblique front side thereof can be effectively prevented. In addition, the vehicle body 1, during running, always rocks back and forth and from side to side and repeats so called pitching and rolling movements. Assuming an arrangement in which the subsidiary wheels 8 are provided on both sides of the front wheel 2 or of the rear wheel 3, the wheels 8 are liable to come into contact with the ground unintentionally. However, in the case where the wheels are provided on both sides at the middle portion of the vehicle body 1 such drawback can be prevented. In other words, during pitching and rolling of the vehicle body 1, the middle portion of the vehicle remains at a constant distance from the ground, and accordingly unexpected grounding of the subsidiary wheels 8 is prevented.

Figure 12:
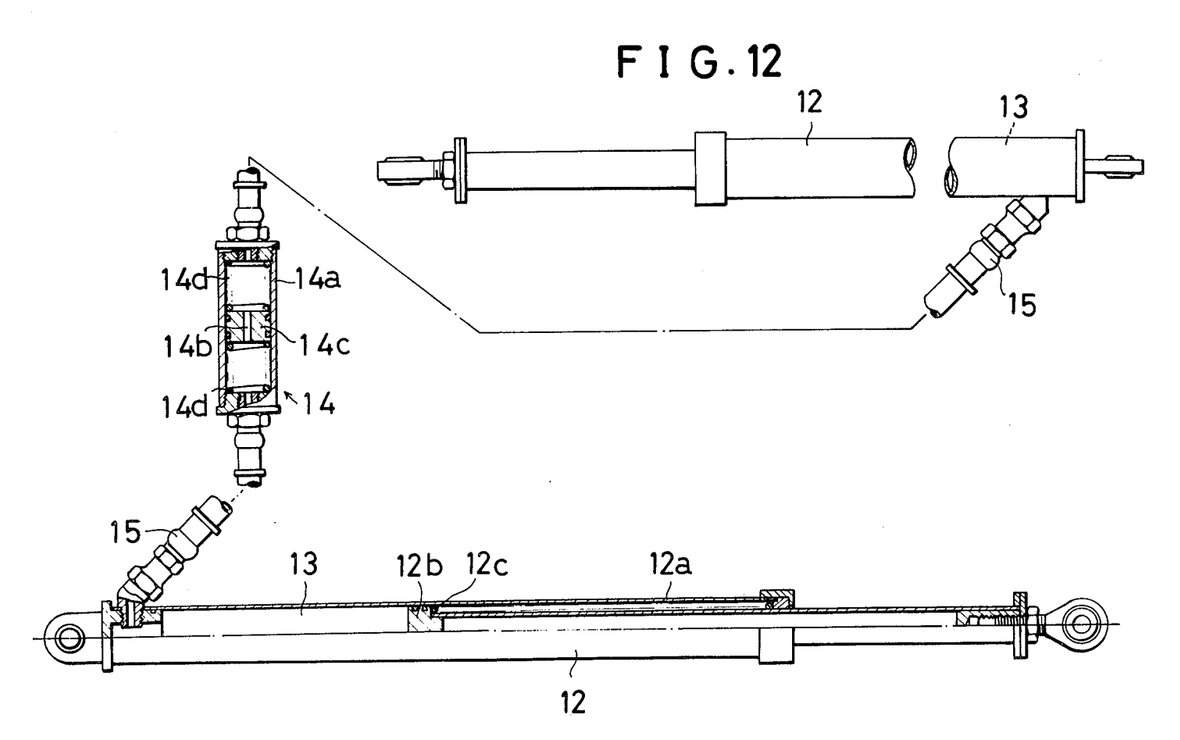
FIG. 12 is an enlarged sectional plan view of one embodiment of a flow control valve portion of the apparatus.

The flow control valve 14 can be a simple orifice, but it is preferable that the valve is constituted as a free piston valve as shown for instance, in FIG. 12. Namely, in the illustrated embodiment, the valve 14 comprises a piston 14c, having a central orifice 14b, slidably mounted in a valve housing 14b so as to be movable in the longitudinal direction against the action of springs 14d disposed on both sides of the piston. The valve operates in such a manner that when a rapid rise of oil pressure takes place in the oil pressure chamber 13 on one side, the piston 14c is firstly displaced thereby to absorb the pressure increase, and then the oil passes through the orifice 14b and consequently the piston 14c is returned to its neutral position for being ready for the next operation.

Figure 13:
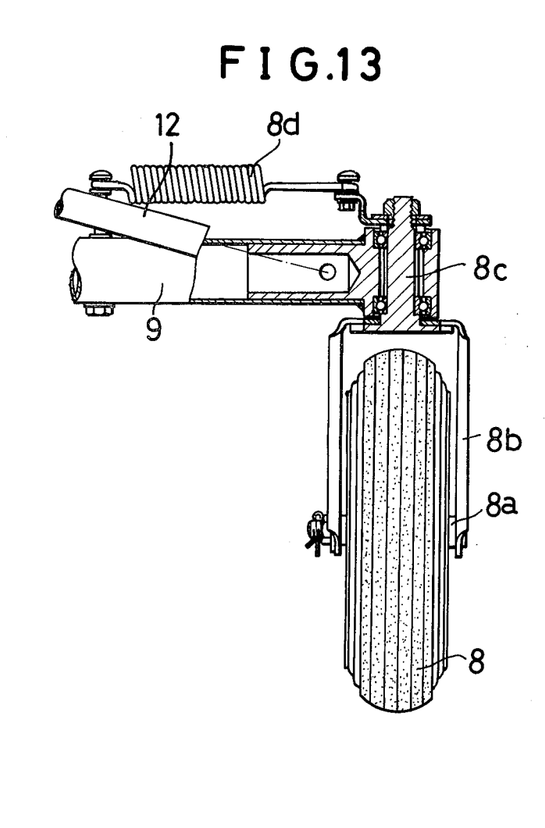
FIG. 13 is an enlarged front view, partly in section, of a subsidiary wheel portion.
Figure 14:
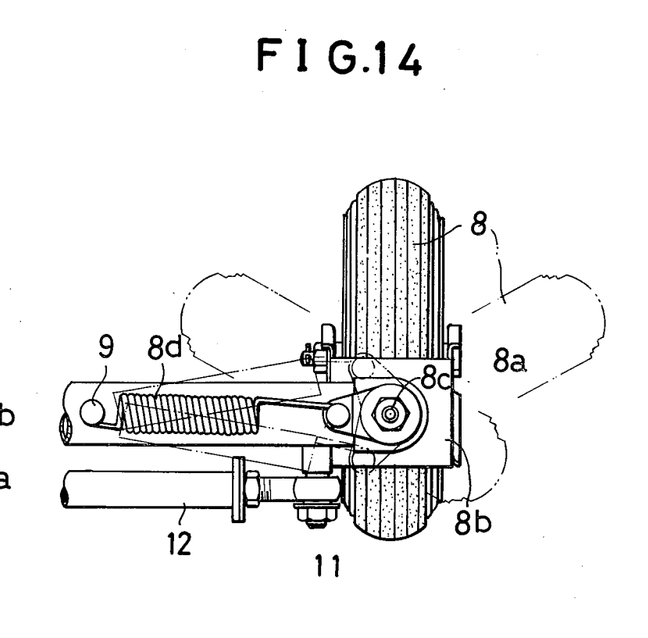
FIG. 14 is a top plan view thereof.

It is preferable that each subsidiary wheel 8 be of a caster type. FIGS. 13 and 14 show one embodiment thereof. A wheel supporting frame 8b which supports the wheel 8 rotatably through a horizontal shaft 8a thereof is rotatably attached to the front end portion of the arm member 9 through a vertical shaft 8c provided at a position offset from the shaft 8a. Additionally, the supporting frame 8b is acted on by outside spring 8d to be directed forwards in ordinary driving condition, and thus the wheel 8 is maintained in the forward direction by the action of the spring 8d at the time of no load. However, when applied with any load, the wheel is swung to change its direction in accordance therewith so as to follow the loading.

Figures 15, 16:
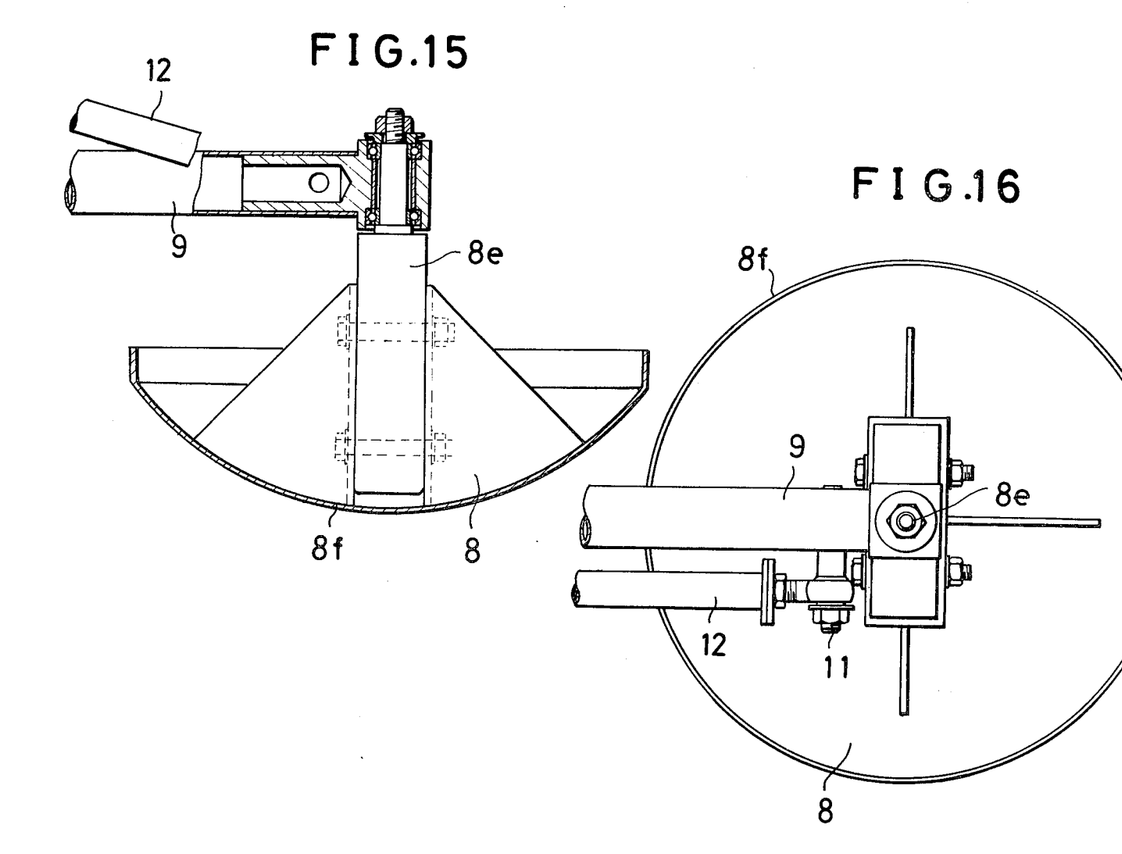
FIG. 15 is a front view, partly in section, of a modified embodiment thereof.
FIG. 16 is a top plan view thereof.

Alternatively, the wheel 8 may be a spherical surface wheel. FIGS. 15 and 16 show one embodiment thereof. The wheel 8 is pivotally supported by a vertical shaft 8e and the bottom surface thereof is formed as a hemispherical surface 8f so that the wheel can be brought into contact with the ground at any desired point on surface 8f. Thus, the wheel operates in almost the same manner as in the case of the caster type wheel.

In substantially the same manner as in the conventional vehicle, the vehicle body 1 is usually provided below the seat 5 with a pair of step members 16 for the feet of the driver. In this case, the step members 16 are positioned behind the positions at which the subsidiary wheels 8 are attached to prevent an accident in which the driver's feet may be caught thereby. Additionally, the step members 16 are downwardly curved projecting rearwards from the arm members 9. In this case, when the wheels 8 contact the ground, the driver's feet are imparted with the reaction from the road surface and this is advantageous when the vehicle is used for testing, training or the like as the driver knows when the wheels 8 strike the ground.

Thus, according to this invention, the pair of left and right subsidiary wheels are disposed on both sides of the vehicle along a line extending in the vicinity of the center of gravity of the vehicle body, so that when the vehicle body inclines towards one side or the other, the subsidiary wheel on the inclining side is first grounded for supporting the vehicle body laterally at one side at the longitudinal location of the center of gravity, and thus effectively prevent subsequent turnover thereof, in the oblique forwardly direction as can, for example, occur when the subsidiary wheels are disposed on both lateral sides of the rear wheel of the vehicle body. Additionally, it is advantageous in the construction of the invention that the subsidiary wheels do not unexpectedly strike the ground during pitching and rolling of the vehicle body during normal driving thereof.

What is claimed is:

1. Apparatus for preventing turnover of a motorized two-wheeled vehicle comprising a vehicle body, front and rear wheels supporting said body, a drive engine supported on said body between said wheels to provide a center of gravity for the vehicle in the vicinity of the engine, a pair of left and right arms extending laterally from the vehicle body and pivotally connected thereto for upwards and downwards movement, subsidiary wheels supported on said arms, a first and second damper means between the body and respective arms, tube means interconnecting the first and second damper means, and flow control valve means in said tube means for activating said second damper means in response to action on said first damper means, said wheels being positioned by said arms to be disposed on a line extending in the vicinity of said center of gravity.

2. Apparatus as claimed in claim 1 wherein each said damper means comprises a pressure chamber, said tube means comprising a connecting tube interconnecting the pressure chambers of the damper means.

3. Apparatus as claimed in claim 2 wherein said flow control valve means is positioned centrally between the pressure chambers of the damper means.

4. Apparatus as claimed in claim 2 wherein each said damper means comprises an oil pressure damper connected to said vehicle body at a location above the connection of said arm to said body.

5. Apparatus as claimed in claim 2 wherein said flow control valve means comprises a valve housing, a free piston slidable in said housing, said piston having an axial orifice therethrough establishing communication between the pressure chambers of the damper means, and spring means acting on said piston on opposite sides thereof to maintain the piston in an intermediate position in said housing.

6. Apparatus as claimed in claim 1 comprising means supporting each subsidiary wheel from its respective arm such that the wheel is biassed to face normally frontwards but is capable of turning under the action of applied force.

7. Apparatus as claimed in claim 1 wherein each said subsidiary wheel has a lower hemispherical surface.

* * * * *